UNITED STATES PATENT OFFICE.

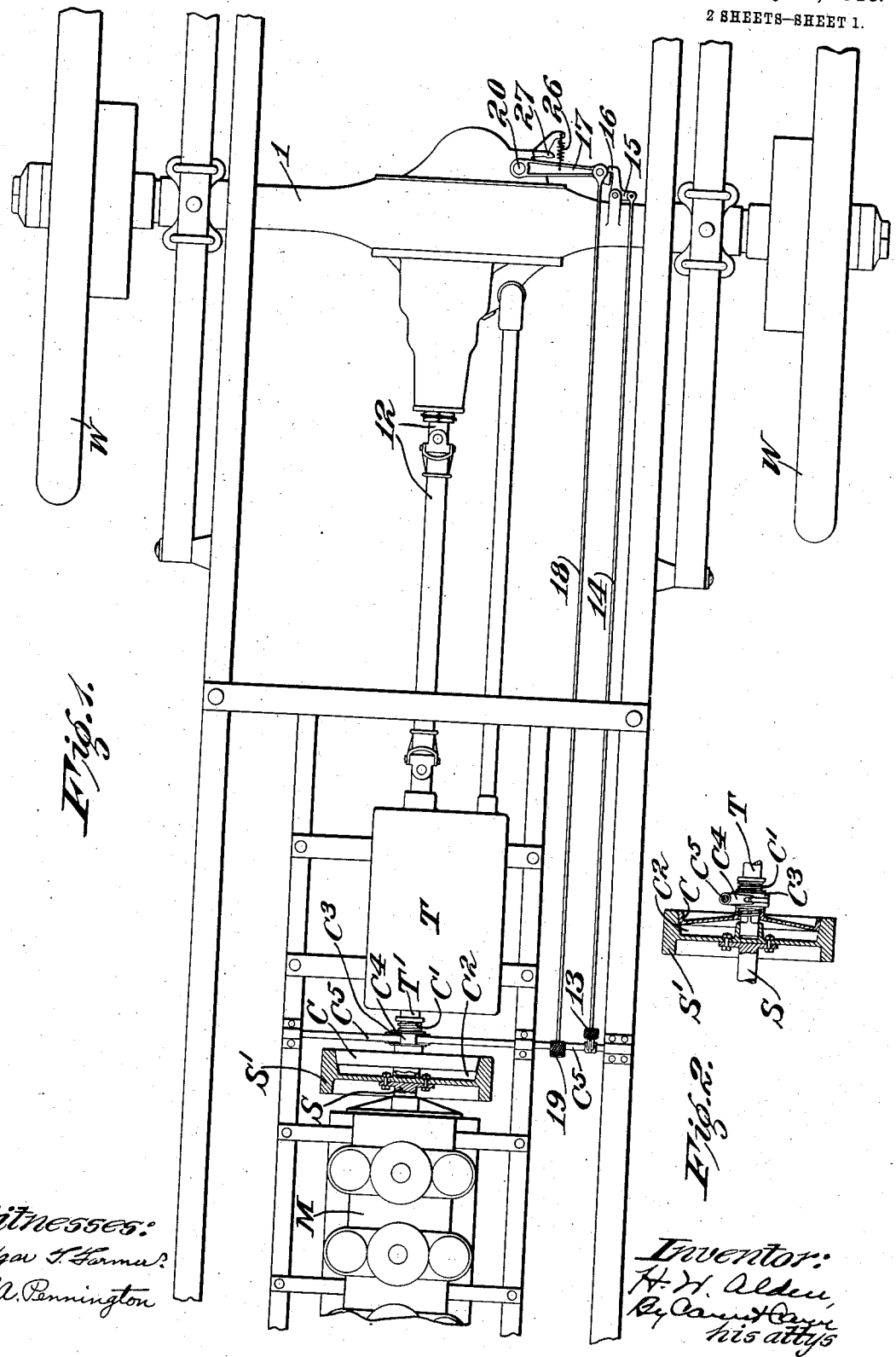

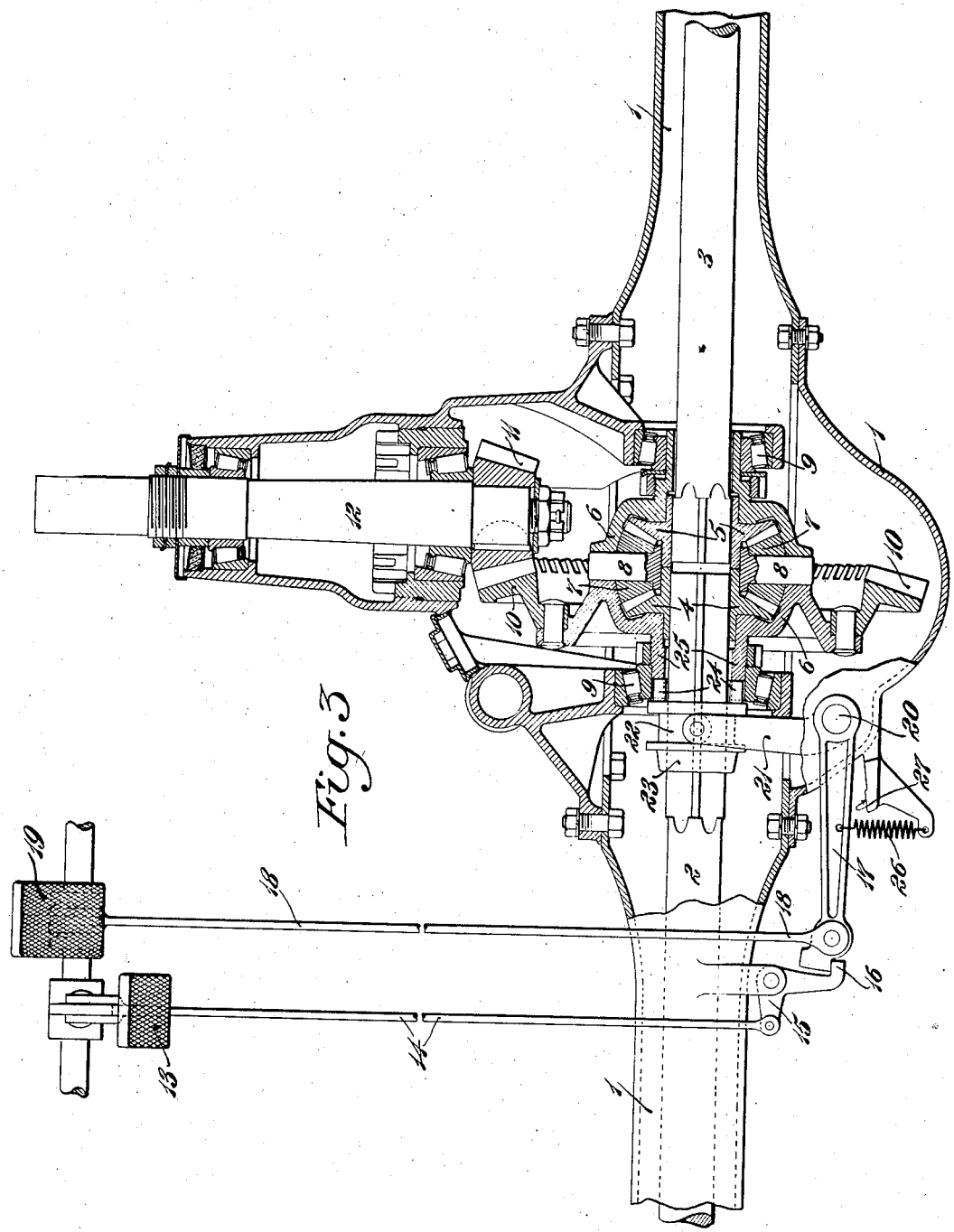

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

DIFFERENTIAL GEARING.

1,063,001.  Specification of Letters Patent.  Patented May 27, 1913.

Application filed September 7, 1912. Serial No. 719,241.

*To all whom it may concern:*

Be it known that I, HERBERT W. ALDEN, a citizen of the United States, and a resident of the city of Detroit, in the county of Wayne and State of Michigan, have invented a new and useful Improvement in Differential Gearing, of which the following is a specification.

This invention relates to lock mechanism for differential gearing of automobiles.

Differential gearing locks have been heretofore provided on automobiles. In some cases, the device is so constructed and arranged that the car must be brought to a standstill and the driver or a second person has to throw in the lock from outside the car while the engine is not running or the transmission clutch is off. In other cases, the lock mechanism is operated from the driver's seat, and it is possible to throw in the lock while the engine is running and the transmission clutch is on and probably one wheel is lagging. In the first mentioned cases, there is the inconvenience of having to stop the vehicle and getting out to effect the lock. In the latter cases, there is a tremendous strain set up instantly in all the parts of the differential mechanism with the result that the mechanism becomes damaged and soon goes to pieces; and it is impracticable to build such mechanism heavy enough to withstand this strain. Furthermore, unless some provision is made for releasing the differential lock before the vehicle makes a turn, the tires will soon wear out.

The present invention has for its principal objects to produce a differential lock mechanism which may be operated from the driver's seat and will overcome the disadvantages above set forth; to provide against throwing the lock accidentally in or out while the transmission clutch is on; to provide for the automatic release of the lock as said clutch is thrown off; and to attain certain advantages which will hereinafter more fully appear.

The invention consists in the parts and in the arrangements and combinations of parts hereinafter described and claimed.

In the accompanying drawing which forms part of this specification and wherein like symbols refer to like parts wherever they occur,—Figure 1 is a plan view of an automobile frame and driving mechanism, showing an adaptation of the invention; Fig. 2 is a view, partly in elevation and partly in longitudinal vertical section, showing the transmission clutch members; and Fig. 3 is a view on an enlarged scale, showing the differential gearing in horizontal section and the locking and controlling members in top plan.

The invention is applicable to any type of differential mechanism. For purpose of illustration, the lock is shown in connection with a bevel gear differential mechanism. The differential mechanism is mounted in an axle casing 1, on whose outer end portions the driving wheels W are journaled. The divided axle shaft sections 2, 3, extend through this casing and have their outer end portions suitably fixed to the respective wheels so as to impart motion thereto. The inner end portions of the axle shaft sections 2, 3, are keyed in the hub portions of the oppositely disposed differential bevel gears 4, 5, which are journaled in a housing 6. Bevel pinions 7 meshing with the gears 4, 5, are fitted rotatably on studs 8 carried by the housing 6. The housing 6 is mounted on antifriction bearings 9 and it is provided with a bevel driving gear 10 which meshes with a bevel pinion 11 on the end of the propeller shaft 12. The propeller shaft is obviously connected with a suitable changeable speed transmission gearing T, which latter is connected with the crank shaft S of the motor M by a releasable clutch member C.

In practice, the releasable transmission clutch member is usually arranged and adapted to be thrown on by a spring and is released or thrown off by a foot lever or pedal. The brake lever is also usually connected with the mechanism so that it effects the release of the clutch when moved in the direction to set the brakes. These arrangements are obvious and well known and, therefore, for the purpose of illustrating the present invention, only the foot lever is shown; it being understood that the transmission clutch is thrown off when said foot lever is moved forward.

The clutch member C, as shown in Figs. 1 and 2, is keyed slidably on a transmission shaft $T^1$ and is releasably held, by a spring $C^1$, in engagement with a counterpart clutch seat $C^2$ in the fly wheel $S^1$ which is fixed on the crank shaft S. This clutch member C is provided with the usual annularly grooved collar $C^3$ with which coöperates a shipper yoke $C^4$ fastened tight on a transverse rock-shaft $C^5$; and on this rock-shaft is also fixed the foot lever or pedal. The foot lever or pedal is indicated at 13 and is connected by a rod 14 to one arm of a bell-crank latch member 15. The opposite arm of the latch member is provided with an angular projection or hook 16. This portion 16 is adapted to engage behind the end portion of a horizontal lever arm 17 of the differential lock mechanism as shown in the drawing so as to hold the lock clutch in on position. It is also adapted to move in front of said lever arm 17 in the off position of the lock clutch as will presently appear. The lever arm 17 is connected by a rod 18 to a foot lever or pedal 19, which is loosely pivoted on said rock-shaft $C^5$ and will hereinafter be referred to as the lock pedal.

The lever arm 17 is fastened to a vertical rock shaft 20 which is suitably journaled in the axle casing adjacent to the differential gearing. On this shaft is fastened a second lever arm 21 whose free end portion is arranged and adapted to engage the annularly grooved portion 22 of a clutch sleeve 23 which is feather-keyed on the driving axle shaft section 2. This clutch sleeve is provided with fingers or locking portions 24 adapted to engage like portions or counterpart recesses at the end of the hub portion 25 of the differential gear housing 6.

The lever arm 17 is provided with a spring 26 which is adapted to withdraw the lock clutch sleeve 23 from engagement with the differential gear housing when the pedal 19 is released; and a stop 27 is provided on the axle casing for the lever arm in the "off" position. By this arrangement, the latch member 15 being moved so that its hook or projection 16 is clear of the lever arm 17, the spring 26 always pulls the lock clutch off unless the pedal 19 is held forward by the driver's foot. Hence, assuming that the lock clutch has been thrown on and the transmission clutch is also on, the parts being in the position shown in the drawing, the first time the driver presses the pedal 13 to release the clutch member C in slowing down to make a turn, the latch member 15 is moved so as to clear the lever arm 17, whereupon the lock is thrown off by the spring 26. Should the driver release the pedal 13 so as to throw on the transmission clutch before the differential lock has again been thrown on, the finger or hook 16 of the latch member will be in front of the lever arm 17 and consequently the lock cannot be thrown on until the pedal 13 is moved forward under pressure of the driver's foot. It is thus apparent that the differential lock cannot be thrown on accidentally while the propeller shaft is clutched to and being driven by the engine crank shaft; and that in case the driver throws on the differential lock and lets on the transmission clutch and starts away, the first time that he throws the transmission clutch off the differential lock is immediately thrown off. Hence, there is no possibility of damaging the differential mechanism by reason of the lock being thrown on or off while the propeller shaft is being driven; and the driver is prevented from throwing on the lock and continuing to use it indefinitely, in which case the tires would soon wear out.

Obviously, the device admits of considerable modification without departing from the invention. Therefore, I do not wish to be limited to the specific construction and arrangement shown.

What I claim is:

1. The combination with a releasable transmission clutch member, of a differential gearing, a movable locking element adapted to lock the differential gearing, and means for shifting said locking element into and out of locking position, said means being inoperative while the transmission clutch member is engaged.

2. The combination with a releasable transmission clutch member, of a differential gearing, a movable locking element adapted to lock the differential gearing, means for shifting said locking element into and out of locking position, said means being inoperative while the transmission clutch member is engaged, and means for effecting the release of said locking element automatically as the transmission clutch member is released.

3. The combination with a transmission clutch lever adapted to throw off the releasable clutch member when moved in one direction, of a differential gearing, a movable locking element adapted to lock the differential gearing, a lever mechanism for shifting said locking element into and out of locking position, and a locking element for said lever mechanism, said second mentioned locking element being connected with said transmission clutch lever so as to release the lever mechanism as said transmission clutch lever is moved to throw off the clutch and whereby also said lever mechanism is rendered inoperative while the transmission clutch is on.

4. The combination with a releasable transmission clutch member and two divided driving shaft sections, of a differential gearing connecting the inner ends of said driving shaft sections, a locking element mounted on one of said shaft sections so as to be movable longitudinally thereon, but being fixed to rotate therewith, said locking element being adapted for engagement with one of the elements of the differential gearing so as to lock said gearing, a lever mechanism for shifting said locking element into and out of locking position, and a lock for said lever mechanism, said second mentioned lock being connected to said transmission clutch member so that said lever mechanism is inoperative while the transmission clutch is on.

5. The combination with a releasable transmission clutch member and two divided driving shaft sections, of a differential gearing connecting the inner ends of said driving shaft sections, a locking element mounted on one of said shaft sections so as to be movable longitudinally thereon, but being fixed to rotate therewith, said locking element being adapted for engagement with one of the elements of the differential gearing so as to lock said gearing, a lever mechanism for shifting said locking element into and out of locking position, a lock for said lever mechanism, said second mentioned lock being connected to said transmission clutch member so that said lever mechanism is inoperative while the transmission clutch is on, and means for throwing off the differential gearing lock automatically as the transmission clutch is thrown off.

6. The combination with a releasable transmission clutch member, of a divided driving shaft, a differential gearing connecting the inner ends of said driving shaft sections, a locking element mounted on one of the shaft sections so as to be movable longitudinally thereon, but being fixed to rotate therewith, said locking element being adapted to engage one of the elements of said differential gearing so as to lock said gearing, actuating mechanism for said locking element including a lever arm, a stop, a spring for withdrawing said locking element and yieldingly holding said lever arm against said stop when said locking element is out of locking position, an operating lever connected to said lever arm; and a locking element adapted to lock said lever arm both in "on" and "off" positions, said locking element for the lever arm being connected with the transmission clutch member so that the actuating mechanism for the locking element for the differential gearing is inoperative while the transmission clutch is on and whereby also the lever arm is released automatically as said transmission clutch is thrown off.

Signed at Detroit, Michigan, this 31 day of August, 1912.

HERBERT W. ALDEN.

Witnesses:
 LESLIE WILLIAMS,
 HARVEY L. WEDLAKE.